US011782676B2

(12) United States Patent
Shah et al.

(10) Patent No.: US 11,782,676 B2
(45) Date of Patent: Oct. 10, 2023

(54) MULTI-MODAL INPUT CAPTURE AND OUTPUT PRESENTATION SYSTEM FOR ENHANCING COMMUNICATIONS USING FACE COVERINGS

(71) Applicant: The Open Network, LLC, Cupertino, CA (US)

(72) Inventors: Nita Nitin Shah, Cupertino, CA (US); Nitin Jayant Shah, Cupertino, CA (US)

(73) Assignee: The Open Network, LLC, Cupertino, CA (US)

( * ) Notice: Subject to any disclaimer, the term of this patent is extended or adjusted under 35 U.S.C. 154(b) by 162 days.

(21) Appl. No.: 17/329,857

(22) Filed: May 25, 2021

(65) Prior Publication Data
US 2021/0373850 A1    Dec. 2, 2021

Related U.S. Application Data

(60) Provisional application No. 63/030,539, filed on May 27, 2020.

(51) Int. Cl.
| | | |
|---|---|---|
| *A41D 13/11* | (2006.01) | |
| *G10L 15/20* | (2006.01) | |
| *G06F 3/16* | (2006.01) | |
| *H04R 1/08* | (2006.01) | |
| *H04R 1/46* | (2006.01) | |

(52) U.S. Cl.
CPC ............. *G06F 3/167* (2013.01); *H04R 1/083* (2013.01); *H04R 1/46* (2013.01); *G06F 2203/0381* (2013.01)

(58) Field of Classification Search
CPC ............ A41D 13/11; A61F 2013/00476; G10L 15/20; G10L 17/00
USPC ........................... 128/857–858; 704/233, 246
See application file for complete search history.

(56) References Cited

U.S. PATENT DOCUMENTS

| 6,522,531 B1 * | 2/2003 | Quintana ................ G06F 1/163 |
| | | 361/679.09 |
| 9,343,066 B1 * | 5/2016 | Cronin .................... G10L 15/26 |
| 2014/0333773 A1 * | 11/2014 | Davis ..................... H04N 23/51 |
| | | 348/158 |

(Continued)

OTHER PUBLICATIONS

Razer Project Hazel <https://press.razer.com/product-news/razer-unveils-smart-mask-and-gaming-chair-concept-designs-at-ces-2021/>, Razer Press. Accessed via internet May 24, 2021.

(Continued)

*Primary Examiner* — George C Monikang
(74) *Attorney, Agent, or Firm* — Young Basile Hanlon & MacFarlane, P.C.

(57) ABSTRACT

Communications involving one or more people wearing face coverings are enhanced over one or more modalities using sensor integrations. In one particular example, a face covering device according to the implementations of this disclosure may include one or more microphones and one or more cameras which capture input directly from the wearer of the face covering device. The input is processed to produce output representing the input in the same modality or in a different modality, and in particular is scaled to, for example, increase a volume of audio and introduce a visual representation of an expression of the wearer's face which is at least partially obscured by the face covering device.

20 Claims, 6 Drawing Sheets

(56) References Cited

U.S. PATENT DOCUMENTS

2017/0039833 A1\* 2/2017 Baczuk .................. E05B 73/00
2022/0096874 A1\* 3/2022 Connor ................ A62B 18/025

OTHER PUBLICATIONS

MaskFone <https://maskfone.com/>, accessed via the internet on May 24, 2021.
Air Pop Active Plus <https://www.airpophealth.com/us/airpop-active-smart-black-yellow> accessed via the internet on May 25, 2021.

\* cited by examiner

MULTI-MODAL INPUT CAPTURE AND OUTPUT PRESENTATION SYSTEM FOR ENHANCING COMMUNICATIONS USING FACE COVERINGS

CROSS-REFERENCE TO RELATED APPLICATION(S)

This disclosure claims the benefit of U.S. Provisional Application No. 63/030,539, filed May 27, 2020, the disclosure of which is hereby incorporated by reference in its entirety.

BACKGROUND

Face coverings are commonly worn in a variety of contexts, including for medical, industrial, religious, recreational, and other purposes. For example, construction or factory workers wear face coverings to prevent the inhalation of potentially hazardous materials present in their work environments. In another example, medical professionals wear face coverings to prevent the spread of disease while providing patient care. In particular, in the context of the COVID-19 pandemic, face coverings such as masks and other personal protective equipment are used both to protect the wearer from infection from others and to protect others from becoming infected by the wearer. While effective for the purpose, conventional face coverings do not include functionality beyond limiting the inhalation or spread of particles.

SUMMARY

Disclosed herein are, inter alia, implementations of systems and techniques for multi-modal sensor integrations for enhancing communications using face coverings.

A face covering device according to one aspect of this disclosure includes one or more microphones, one or more cameras, one or more speakers, one or more displays, a memory, a processor, a body, and a securing mechanism. The one or more microphones are configured to capture audio input data representing speech or non-speech sounds from a wearer of the face covering device. The one or more cameras are configured to capture visual input data representing expressions of the wearer of the face covering device. The one or more speakers are configured to present audio output data produced based on the audio input data. The one or more displays are configured to present visual output data produced based on the visual input data. The memory is configured to store instructions for communication enhancement software. The processor is configured to execute the instructions to detect the audio input data, detect the visual input data, process the audio input data to produce the audio output data, process the visual input data to produce the visual output data, cause the presentation of the audio output data at the one or more speakers, and cause the presentation of the visual output data at the one or more displays. The body is configured to cover at least a portion of a face of the wearer and includes the one or more microphones, the one or more cameras, the one or more speakers, and the one or more displays. The securing mechanism is configured to removably couple the face covering device to at least a portion of the wearer.

A face covering device according to another aspect of this disclosure includes a memory, a processor, and a body. The memory is configured to store instructions. The processor is configured to execute the instructions to detect audio input data captured using a first input component, detect visual input data captured using a second input component, process the audio input data to produce audio output data, process the visual input data to produce the visual output data, cause the presentation of the audio output data at a first output component, and cause the presentation of the visual output data at a second output component. The body is configured to cover at least a portion of a face of a wearer of the face covering device and includes the first input component, the second input component, the first output component, and the second output component.

A face covering device according to yet another aspect of this disclosure includes a body and a securing mechanism. The body includes one or more input components configured to capture input in one or more modalities, one or more output components configured to present output in the one or more modalities, and a processor configured to process the input to produce the output. The securing mechanism is configured to removably secure the body to at least a portion of a face of a wearer of the face covering device.

BRIEF DESCRIPTION OF THE DRAWINGS

This disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Face coverings are generally worn over the nose and mouth so as to cover openings through which particles may be inhaled or exhaled. Because of this, the use of a face covering in many cases creates a barrier to human communications that are commonplace when the face covering is not used. For example, it may be difficult to hear or to understand expressions of a person who is wearing a face covering. For example, because the nose and mouth of the wearer are covered, it is hard to tell when they are smiling, frowning, or presenting other expressions which would be easily understood without the obscuring by the face covering. These often barriers are compounded by physical separations between people. For example, in the context of the COVID-19 pandemic, social distancing rules typically mandated a physical separation of six feet between two people not from the same household. While these physical separation policies may importantly help prevent the spread of disease, they compound a barrier to human communications by the use of face coverings due to the distances required between people. Such physical separation thus makes it even more difficult for people wearing face coverings to effectively communicate using spoken language or expressions.

Accordingly, conventional face coverings inhibit communications between people in one or more modalities, such as those which are aurally and visually perceived. For example, with aural aspects, conventional face coverings may result in distortions to volume, frequency, and direction of sound from the wearer, thereby affecting the ability of another person to hear, comprehend, and be aware of the wearer's speech or non-speech sounds (e.g., whistling, humming, grunting, or like noises vocally made by a human). In another example, with visual aspects, conventional face coverings may result in obscured facial movements, expressions, and moods by the wearer, thereby affecting the ability of another person to see, comprehend, and be aware of the wearer's expressions. For example, a person may misinterpret a face covering wearer's speech sounds, non-speech sounds, or expressions in a way that impairs their communication or ability to interact or that otherwise causes embarrassment to one or both of them. These problems are made worse when more than two people are involved. However, the main purpose of a conventional face covering, for example, protecting the wearer from injury or disease, should not be compromised or else the face covering may be effectively rendered useless.

Implementations of this disclosure address problems such as these using face covering devices which include input components configured to detect input in one or more modalities, processing aspects configured to process the detected input to produce output, and output components configured to present the output in one or more modalities. In one particular example, a face covering device according to the implementations of this disclosure may include one or more microphones and one or more cameras which capture input directly from the wearer of the face covering device. The input is processed to produce output representing the input in the same modality or in a different modality, and in particular is scaled to, for example, increase a volume of audio and introduce a visual representation of an expression of the wearer's face which is at least partially obscured by the face covering device. The face covering device implementations this disclosure contemplate face coverings which are manufactured to include sensor integrations for multi-modal communications as well as sensor integrations which may be retrofit onto existing face coverings to include sensor integrations for multi-modal communications therein.

As used herein, a face covering may include or otherwise refer to an item or set of items intended at least partially to be worn on the head and/or face of a human. Examples of face coverings contemplated by the implementations of this disclosure include, without limitation, face masks used as personal protection equipment, (e.g., such surgical masks, cloth masks, face shields, and the like), religious veils (e.g., niqabs, rubands, hijabs, and the like), fashion apparel (e.g., scarves, balaclavas, and the like), coverings worn by entertainers (e.g., to hide identities, as part of a costume, and the like), helmets (e.g., sport helmets, safety helmets, military helmets, and the like), industrial gear (e.g., gas masks, particulate respirators, and the like), recreational gear (e.g., goggles, martial arts or boxing headgear, skin coverings, underwater gear, cycling gear, inline skating gear, and the like), and face guards (e.g., recreational face guards, face guards worn by security forces, virtual reality gear, and the like). A face covering may include one or separate pieces which may be used together. Alternatively, a face covering may be a piece of a set of equipment, gear, apparel, or other articles which may be used together. As used herein, a face covering device is a device which includes a face covering and computing aspects for implementing the enhanced communication functionality disclosed herein.

Figure 1:
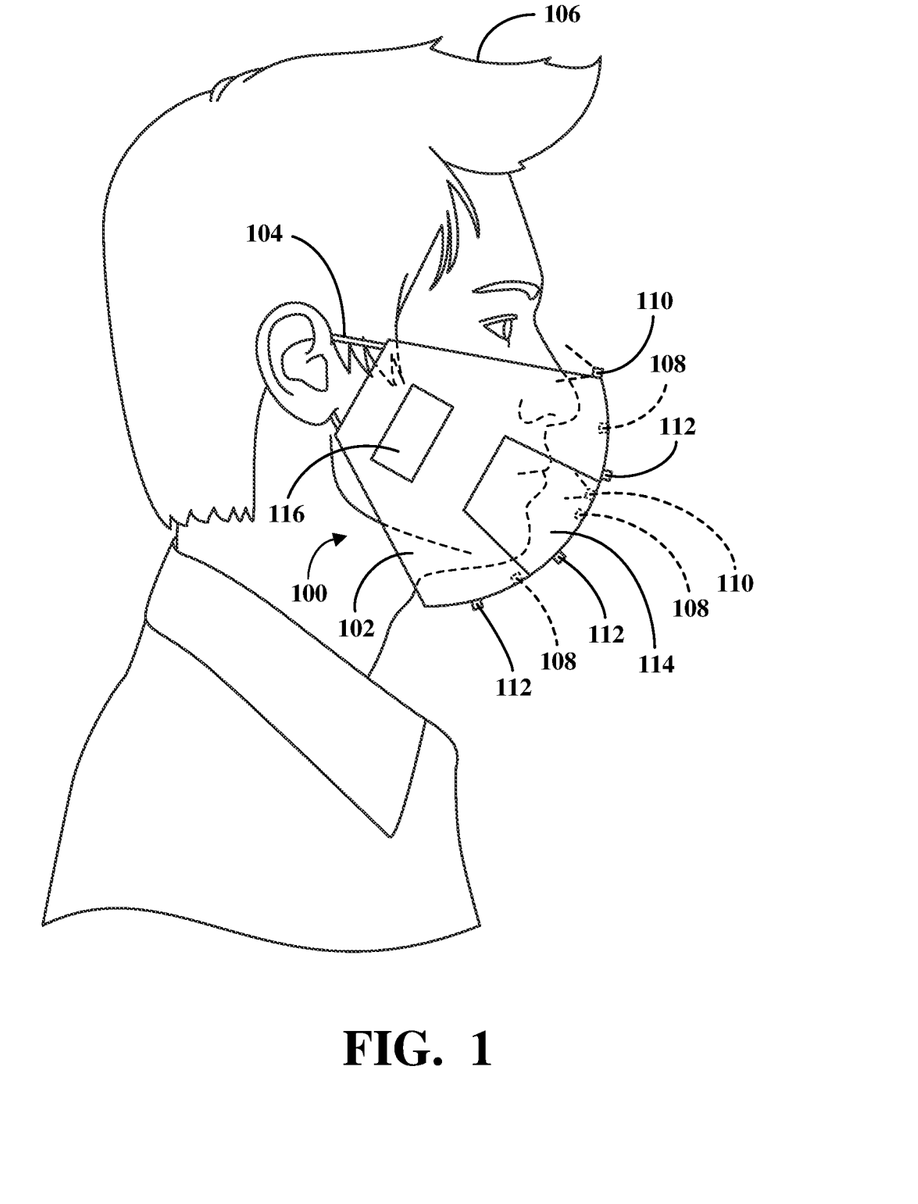
FIG. 1 is an illustration of a first example of a face covering device including integrated sensors for enhancing one or more communication modalities.

To describe some implementations in greater detail, reference is first made to examples of hardware and software structures used to implement multi-modal sensor integrations for enhancing communications using face coverings. FIG. 1 is an illustration of a first example of a face covering device 100 including integrated sensors for enhancing one or more communication modalities. As shown, the face covering device 100 is in a form similar to a face mask, such as a surgical mask, but as noted above may have other forms in accordance with the implementations of this disclosure. The face covering device 100 includes a body 102 and a securing mechanism 104 coupled to the body 102. In use, the body 102 covers at least a portion of a face of a wearer 106, and the securing mechanism 104 securely but removably couples the face covering device 100 to the wearer 106. For example, the securing mechanism 104 may include an aspect configured to be worn around the ears of the wearer 106.

The body 102 includes one or more input components configured to capture input in one or more modalities and one or more output components configured to present output produced based on the input. The one or more input components are sensors which may be configured for one purpose or for multiple purposes. As shown, the input components of the face covering device 100 include microphones 108 and cameras 110. The microphones 108 capture audio input representing speech or non-speech sounds from the wearer 106. The microphones 108 are standalone microphones or microphone arrays and are configured to capture audio in one or more directions. The microphones 108 are located on an internal surface of the body 102 which generally faces the mouth and nose of the wearer 106. Although there are three microphones 108 shown, the face covering device 100 may include other numbers of microphones.

The cameras 110 capture image and/or video input representing expressions made by the wearer 106. The cameras 110 each operate in a visual spectrum or non-visual spectrum. The cameras 110 capture visual input including images and/or video within a field of view at a range of wavelengths. The visual input may represent direct imaging of the mouth, nose, and/or another facial feature of the wearer 106 of the face covering device 100 such as to capture information indicative of expressions of the wearer 106, such as based on movements or positions representing emotions or other sentiments (e.g., smiles or frowns). In some implementations, the visual input may include input from a portion of the face of the wearer 106 of the face covering device 100 which is not covered by the face covering device 100. For example, the visual input may include input representing direct imaging of an eye, eyebrow, cheek, forehead, neck, or other portion of the wearer 106 within the field of view of the camera 110. For example, a mouth of the wearer of the face covering device 100 may be within a field of view of a first camera 110 and the eyes of the wearer of the face covering device 100 may be within a field of view of a second camera 110. The visual input may in some cases be processed to determine inaudible speech activity from movements of the mouth of the wearer of the face covering device 100, for example, using mappings determined by a machine learning model trained for lip reading in one or more languages. The cameras 110 are located on an internal surface of the body 102. In some implementations, one or more of the cameras 110 may be located on an outer surface of the body 102 which generally faces away from the wearer 106. Although there are two cameras 110 shown, the face covering device 110 may include other numbers of cameras.

The input components of the face covering device 100 may be configured to capture input other than directly from the wearer 106. For example, the face covering device 100 may include one or more external microphones 112 located on the outer surface of the body 102 to capture acoustic information within the environment in which the wearer 106 of the face covering device 100 is located. Audio input captured by the external microphones 112 can be used to adjust or reduce the noise and interference created by unwanted audio sources. For example, the face covering device 100 can perform ambient noise reduction such as by onboard noise cancellation based on audio input captured using the external microphones 112. The audio input captured by the external microphones 112 may additionally or alternatively be used to determine directionality or positions of such acoustic sources. This allows for dynamic mapping of the environment in which the wearer 106 of the face covering device 100 is located. This dynamic mapping may, for example, be used to direct or aim a transmitted acoustic signal in a desired direction.

The output components of the face covering device 100 include one or more displays 114 and one or more speakers 116. The displays 114 are screens configured to present visual output such as images, videos, emoticons, lights, colors, text, and the like. The speakers 116 are loudspeakers configured to present aural output such as audio. Although one display 114 and one speaker 116 are shown, the face covering device 100 may include other numbers of displays and/or other numbers of speakers. The face covering device 100 includes an onboard processor or other chip (not shown) for detecting the input using the input components, processing the input to produce output, and presenting output representative of the processed input using the output components. For example, the onboard processor or other chip may be one or more of a field programmable gate array (FPGA), a programmable logic device (PLD), a reconfigurable computer fabric (RCF), a system on a chip (SoC), an application specific integrated circuit (ASIC), and/or another type of integrated circuit.

The face covering device 100 is formed to enable operation of the input components and output components at appropriate proximities to the wearer 106. For example, the face covering device 100 may have a frame (e.g., in just the body 102 or elsewhere, as well) configured to maintain space between the mouth of the wearer 106 and the microphones 108 and the cameras 110 while the face covering device 100 is worn. For example, without such a frame, such as in the case of a cloth face mask and other face covering forms, the microphones 108 and the cameras 110 may rub against the face of the wearer 106, resulting in distorted input capture and unsatisfactory input processing. In some implementations, the frame may be rigid. In some implementations, the frame may be flexible.

The input captured at the face covering device 100 may be processed using mappings determined by one or more machine learning models to produce the output for presentation. For example, the one or more machine learning models may include a machine learning model trained for lip reading, as described above. In another example, the one or more machine learning models may include a machine learning model trained for expression recognition to process the audio and/or visual input to determine expressions to present as output. In another example, the one or more machine learning models may include a machine learning model trained to correlate audio and video to determine a person to whom to direct the output produced at the face covering device 100. In another example, the one or more machine learning models may include a machine learning model trained based on real-time data processed at the face covering device 100 specific to the wearer 106 to deduce output to present based on certain idiosyncratic traits of the wearer 106 himself or herself.

The machine learning models may be implemented at a server device configured to communicate with the face covering device 100. The mappings used by the face covering device 100 may represent patterns for identifying which types of output are based on which types of input and are determined by training the respective machine learning models using data sets which may in at least some cases be received from the face covering device 100 and/or other face covering devices. Alternatively, the machine learning models may be implemented at the face covering device 100 itself, such as where a satisfactory computing aspect onboard the face covering device 100 is capable of training the machine learning models and using the machine learning models for inference.

In some implementations, the face covering device 100 may omit one or more of the input components and/or one or more of the output components described herein. For example, the face covering device 100 may omit the cameras 110 and the displays 114. In such a case, the face covering device 100 may be configured only for audio input detection, processing, and presentation. For example, the face covering device 100 may include one or more microphones 108 on the inner surface of the body 102 and one or more speakers 116 on the outside of the body 102. The microphones 108 would capture speech or non-speech sounds from the wearer 106 and the speakers 116 would present the speech or non-speech sounds, with or without processing, for one or more other people to hear. In another example, the face covering device 100 may omit the displays 114 and instead include a different form of visual output, such as a light indicator, which may include or otherwise be a light emitting diode (LED). For example, the LED can output a color intended to represent an expression, speech sound, non-speech sound, or other aspect of the wearer 106.

In some implementations, the face covering device 100 may include input components beyond the microphones 108 and the cameras 110 and/or output components beyond the displays 114 and the speakers 116. For example, the face covering device 100 may include input components such as one or more of: temperature sensors configured to capture temperature information of the wearer 106; haptic sensors configured to capture vibratory and/or muscular tension information of the wearer 106; biometric sensors configured to capture heart rate, heart rate variability, blood oxygenation, perspiration, and/or other information of the wearer 106; or the like. In another example, the face covering device 100 may include output components such as a headset configured to cover one or both eyes of the wearer 106, such as alternate or augmented reality glasses, a personal audio presentation aspect, such as headphones, or the like. For example, the headphones may be in-ear buds which are inserted into the ears of the wearer 106. In another example, the headphones may use bone conduction to deliver the audio through the skull of the wearer 106 such as around the ear. In some such implementations, the personal audio presentation aspect may be built into the securing mechanism 104 of the face covering device 100. For example, the securing mechanism 104 may include in-ear buds depending from a portion which secures the body 102 of the face covering device 100 around the ears of the wearer 106. In another example, the securing mechanism 104 may include bone conduction features built into the securing mechanism 104 itself.

In some implementations, the face covering device 100 may further include one or more proximity sensors configured to detect a near proximity of an object to the face covering device 100. A processor of the face covering device 100 may process the data captured using such a proximity sensor to present output alerting the wearer as to the near proximity of the object to the face covering device 100. For example, the one or more proximity sensors may include one or more radar, LIDAR, infrared, electromagnetic, light, or other sensor configured to measure a distance between it and a detected object. In some such implementations, the output alerting the wearer 106 as to the near proximity of the object to the face covering device 100 may be presented to the wearer 106 in response to a detection of the object. In other such implementations, the output alerting the wearer 106 as to the near proximity of the object to the face covering device 100 may be presented to the wearer 106 in response to a determination that a distance between such a detected object and the face covering device 100 is within a threshold range of the face covering device 100.

Implementations of the face covering device 100 may include variations of componentry beyond input components and output components. In some implementations, the face covering device 100 may include a replaceable filter configured to filter particulates within the air surrounding the wearer 106. In some implementations, the face covering device 100 may include one or more aspects intended to increase the comfort of the face covering device 100 while in use with the wearer 106.

Figure 2:
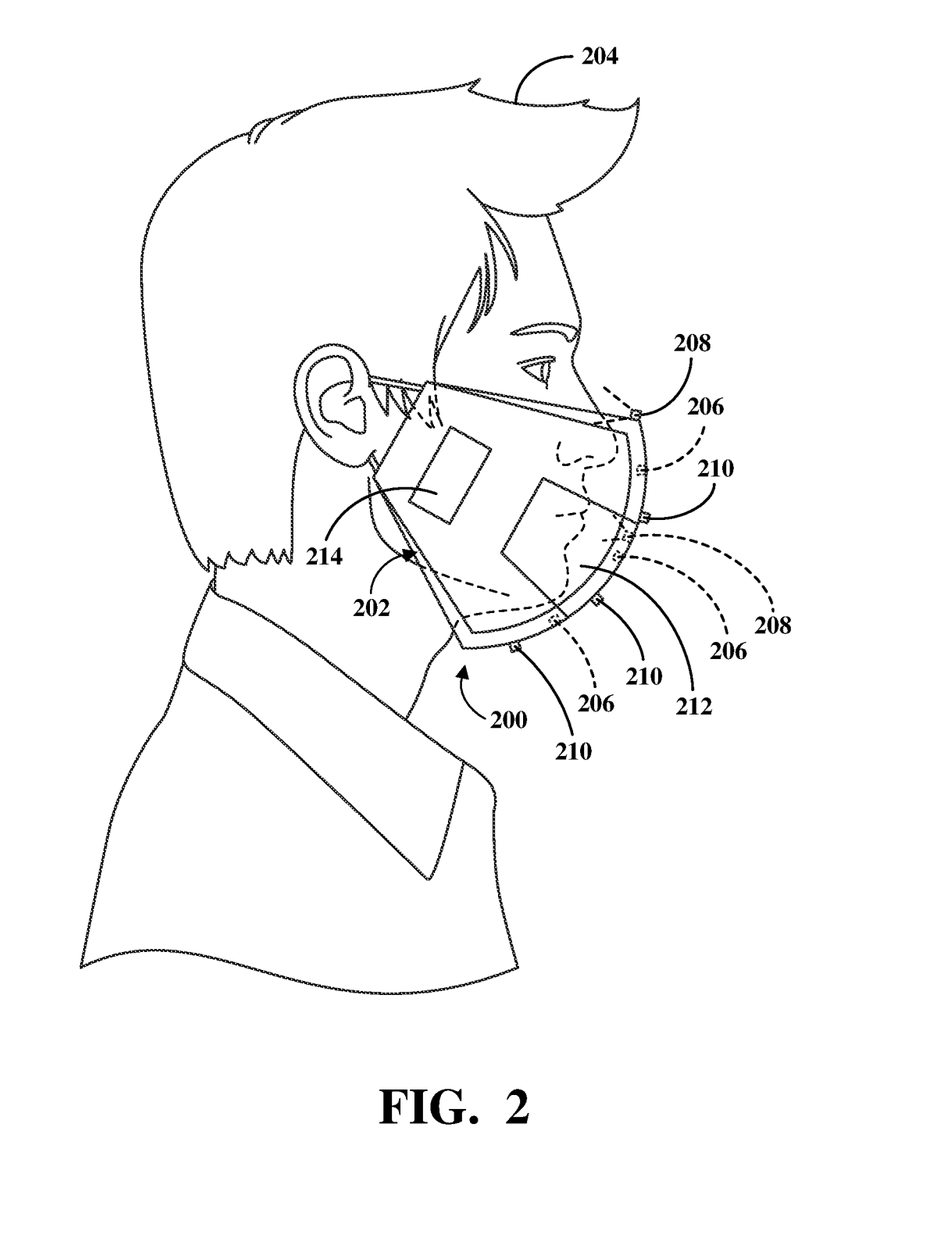
FIG. 2 is an illustration of a second example of a face covering device including integrated sensors for enhancing one or more communication modalities.

FIG. 2 is an illustration of a second example of a face covering device 200 including integrated sensors for enhancing one or more communication modalities. The face covering device 200 is similar to the face covering device 100 shown in FIG. 1, but is retrofit onto an existing face covering 202 so as to integrate the input components and output components disclosed herein, and the various processing functionality associated therewith, with the existing face covering 202. For example, the face covering device 200 may be a separate structure configured to be worn with the face covering 202. The face covering device 200 may, for example, be removably coupled to the face covering 200 using some coupling mechanism, which may, for example, be one or more of an interference fit, a peg and hole or other tab and slot configuration, a snap engagement, a hook and loop fastener engagement, or another fastening implement. In this way, the face covering device 200 may be used with various face coverings 200 at different times, such as to accommodate different religious, recreational, fashion, health, and/or other preferences or requirements of a wearer 204 thereof.

Similar to the face covering device 100, the face covering device 200 includes one or more microphones 206, one or more cameras 208, one or more external microphones 210, one or more displays 212, and one or more speakers 214, which may, for example, respectively be the microphones 108, the cameras 110, the external microphones 112, the displays 114, and the speakers 116 shown in FIG. 1. The face covering device 200 may be considered to have a body which includes the microphones 206, the cameras 208, the external microphones 210, and the displays 212. Rather than implementing these input components and output components into a single permanent piece as in the face covering device 100, however, the input components and output components shown and described with respect to FIG. 2 are instead retrofit and removably coupled to a separate face covering. For example, the face covering device 200 may include a body including a structure which can be worn underneath the face covering 202. In another example, the face covering device 200 may include a body including a structure which can be worn partially underneath and partially over the face covering 202. In yet another example, the face covering device 200 may include a body including a structure which can be worn over the face covering 202.

Figure 3:
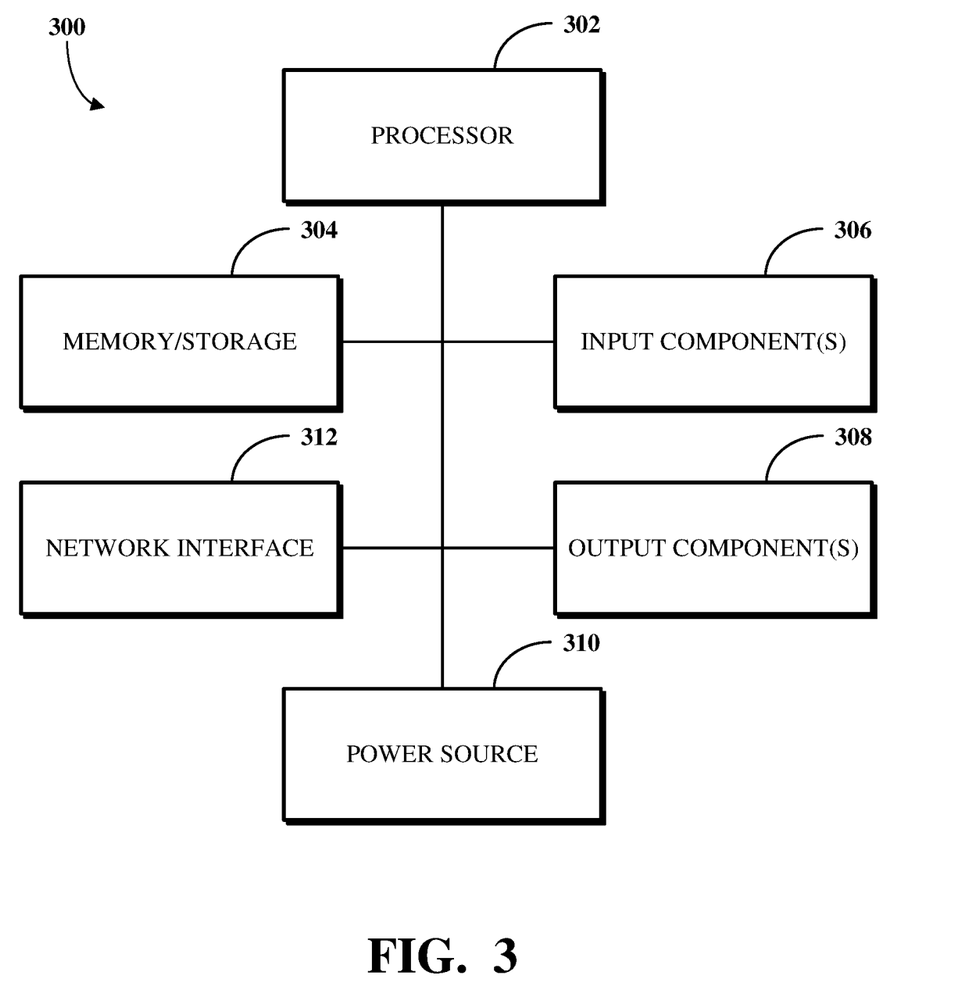
FIG. 3 is a block diagram of an example of an internal configuration of a face covering device.

FIG. 3 is a block diagram of an example of an internal configuration of a face covering device 300, which may, for example, be the face covering device 100 shown in FIG. 1 or the face covering device 200 shown in FIG. 2. The face covering device 300 includes components or units, such as a processor 302, a memory/storage 304, one or more input components 306, one or more output components 308, a power source 310, and a network interface 312. One or more of the memory/storage 304, the one or more input components 306, the one or more output components 308, the power source 310, or the network interface 312 can communicate with the processor 302 via a bus 314.

The processor 302 is a central processing unit, such as a microprocessor, and can include single or multiple processors having single or multiple processing cores. Alternatively, the processor 302 can include another type of device, or multiple devices, now existing or hereafter developed, configured for manipulating or processing information. For example, the processor 302 can include multiple processors interconnected in one or more manners, including hardwired or networked, including wirelessly networked. For example, the operations of the processor 302 can be distributed across multiple devices or units that can be coupled directly or across a local area or other suitable type of network. The processor 302 can include a cache, or cache memory, for local storage of operating data or instructions.

The memory/storage 304 includes one or more memory components, which may each be volatile memory or non-volatile memory. For example, the volatile memory of the memory/storage 304 can be random access memory (RAM) (e.g., a DRAM module, such as DDR SDRAM) or another form of volatile memory. In another example, the non-volatile memory of the memory/storage 304 can be a disk drive, a solid state drive, flash memory, phase-change memory, or another form of non-volatile memory configured for persistent electronic information storage. The memory/storage 304 may also include other types of devices, now existing or hereafter developed, configured for storing data or instructions for processing by the processor 302. In some implementations, the memory/storage 304 can be distributed across multiple devices. For example, the memory/storage 304 can include network-based memory or memory in multiple clients or servers performing the operations of those multiple devices.

The memory/storage 304 can include data for immediate access by the processor 302. For example, the memory/storage 304 can include executable instructions and application data. The executable instructions can include one or more application programs, which can be loaded or copied, in whole or in part, from non-volatile memory to volatile memory to be executed by the processor. For example, the executable instructions can include instructions for performing some or all of the techniques of this disclosure. The application data can include user data, database data (e.g., database catalogs or dictionaries), configurations, or the like.

The one or more input components 306 include sensors configured to capture input from the wearer of the face covering device 300, input within the environment in which the wearer of the face covering device 300 is located, or the like. The one or more output components 308 include audio, visual, and other aspects configured to present, in one or more modalities, output produced by processing the input.

The power source 310 includes a source for providing power to the face covering device 300. For example, the power source 310 can be an interface to an external power distribution system. In another example, the power source 310 can be a battery. In some implementations, the face covering device 300 may include or otherwise use multiple power sources. In some such implementations, the power source 310 can be a backup battery.

The network interface 312 provides a connection or link to a network. The network interface 312 can be a wired network interface or a wireless network interface. The face covering device 300 can communicate with other devices via the network interface 312 using one or more network protocols, such as using Ethernet, transmission control protocol (TCP), internet protocol (IP), power line communication, an IEEE 802.X protocol (e.g., Wi-Fi, Bluetooth, ZigBee, etc.), infrared, visible light, radio frequency, long term evolution (LTE), 5G, 6G, Z-Wave, another protocol or mobile or satellite connection, or a combination thereof.

In some implementations, one or more of the components or units described with respect to the face covering device 300, or one or more alternative components or units having similar functionality, may be implemented on an onboard processor or other chip. For example, the onboard processor or other chip may be a FPGA, a PLD, a RCF, a SoC, an ASIC, and/or another type of integrated circuit. In such an implementation, the face covering device 300 may be considered to include the integrated circuit instead of the subject components or units individually.

Figure 4:
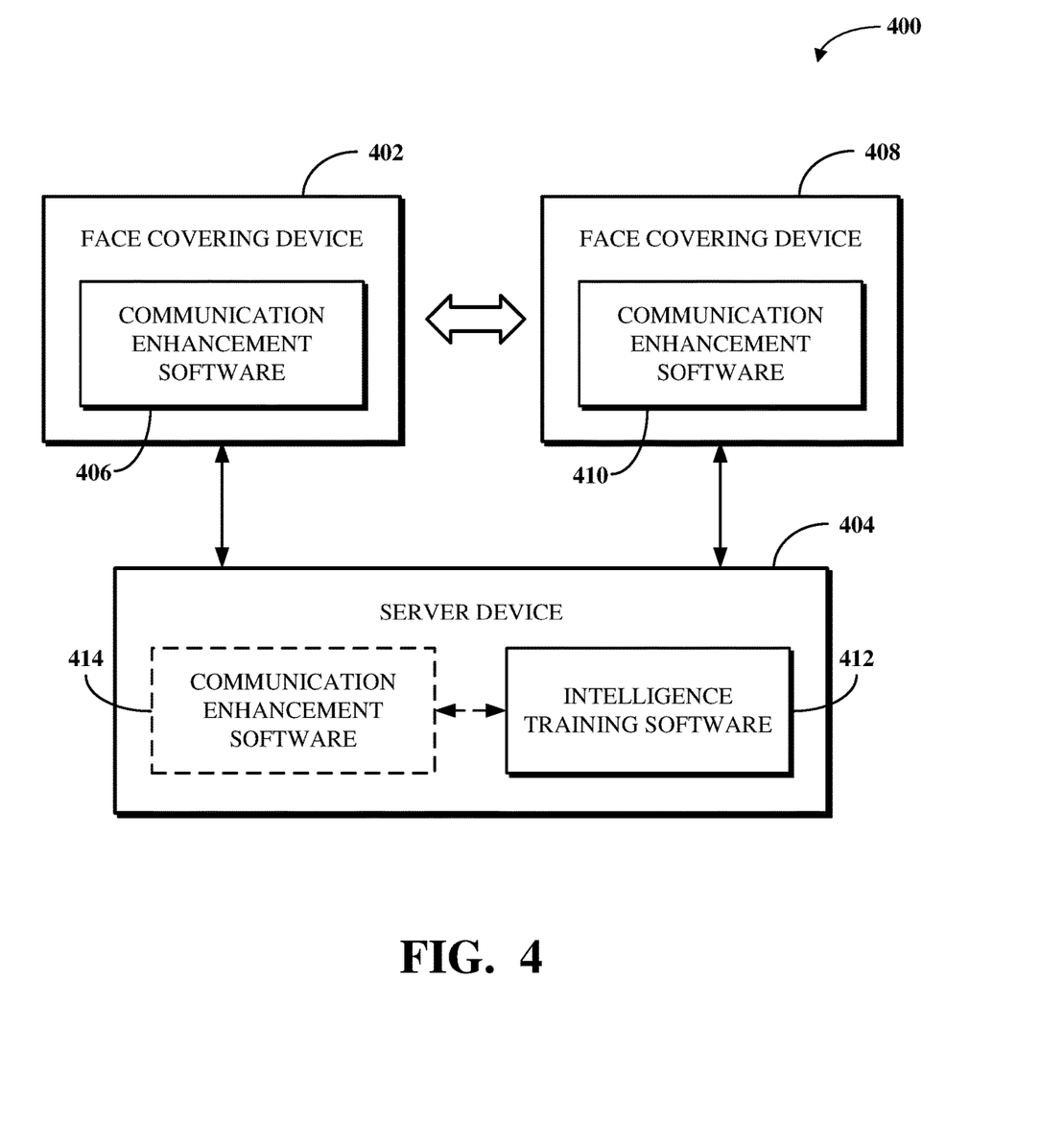
FIG. 4 is a block diagram of an example of a system for enhancing one or more communication modalities using a face covering device including integrated sensors.

FIG. 4 is a block diagram of an example of a system 400 for enhancing one or more communication modalities using a face covering device 402 including integrated sensors, which may, for example, be the face covering device 300 shown in FIG. 3. The system 400 includes the face covering device 402 and a server device 404, which may be a computing aspect in a datacenter or another location which is configured to communicate with the face covering device 402, either directly or via an intermediary relay such as a mobile device of the wearer of the face covering device 402.

The face covering device 402 uses communication enhancement software 406 to enhance communications of the wearer of the face covering device 402 in one or more modalities including by detecting input captured using one or more input components, processing the input to produce output, and presenting the output using one or more output components. In some cases, another face covering device 408 using communication enhancement software 410 and worn by a different wearer may be located proximate to the face covering device 402. For example, the wearer of the face covering device 402 and the wearer of the face covering device 408 may be nearby one another in a physical space. In such a case, the face covering device 402, using the communication enhancement software 406, and the face covering device 408, using the communication enhancement software 410, may be used to enhance communication between the wearers of the face covering device 402 and the face covering device 408. The communication enhancement software 410 may be substantially the same as the communication enhancement software 406 but for any configurations specific to the wearer of the face covering device 402.

The server device 404 includes intelligence training software 412 which trains one or more machine learning models used by the communication enhancement software 406 (and the communication enhancement software 410). A machine learning model trained using the intelligence training software 412 and thus used by the communication enhancement software 406 may be or include one or more of a neural network (e.g., a convolutional neural network, recurrent neural network, or other neural network), decision tree, vector machine, Bayesian network, genetic algorithm, deep learning system separate from a neural network, or other machine learning model.

The intelligence training software 412 trains the machine learning models using training data sets based on the purpose of the machine learning model. For example, the server device 404 can receive data from multiple face covering devices including the face covering device 402 and the face covering device 408 and use that data to train the machine learning models to implement various functionality of the communication enhancement software running at each of those multiple face covering devices. The data received from the various face covering devices may be aggregated where one or more of the machine learning models are trained for a user-agnostic function. In some such cases, the data may be anonymized before aggregation, such as by culling user-specified identifiers. Alternatively, or additionally, the data received from the various face covering devices may be kept separate where one or more of the machine learning models are trained for a user-specific function, such as based on idiosyncrasies of individual users or based on user-specific configurations.

The machine learning models trained using the intelligence training software 412 are used determine mappings of inputs to outputs for use with the face covering device 402 and/or the face covering device 408. For example, a mapping determined using a machine learning model trained for expression recognition may map input indicating a curled up mouth of a wearer of face covering device, as identified within image input data captured using a camera of the face covering device, to a happy expression which can be presented visually such as using an emoticon. In another example, a mapping determined using the machine learning model trained for vocal sound recognition may map audio input data capturing using a microphone of the face covering device and spoken by the wearer thereof to a trans-mediated visual symbol, for example, by mapping speech of the word "stop" detected to be spoken by the wearer to output displaying an image of a stop sign or the text of the word "stop." In yet another example, a mapping determined using a machine learning model trained for lip reading can map input associated with certain mouth shapes either independently or in the context of temporally relevant mouth shapes to certain words which can be presented aurally or visually such as using text. These are merely several examples of the many possible mappings which may be determined using machine learning models and used with the face covering device 402 and/or the face covering device 408.

The mappings are made available to the face covering device 402 and/or the face covering device 408, for example, by data representative of those mappings being transmitted from the server device 404 to the face covering device 402 and/or the face covering device 408. In some implementations, the intelligence training software 412 may be omitted. For example, the mappings used by the face covering device 402 and/or the face covering device 408 may instead be obtained from one or more third party sources.

Generally, the communication enhancement software at a face covering device performs the full set of functionality for detecting input, processing the input to produce output, and presenting the output; however, in some implementations, the server device 404 may run communication enhancement software 414 for performing some of the functionality described with respect to the communication enhancement software at the face covering device. For example, the communication enhancement software 414 may include functionality for receiving input detected at a face covering device, processing the input such as using mappings determined using one or more machine learning models trained using the intelligence training software 412, and thereafter transmitting the output produced by processing the input back to the face covering device for presentation by same.

Figure 5:
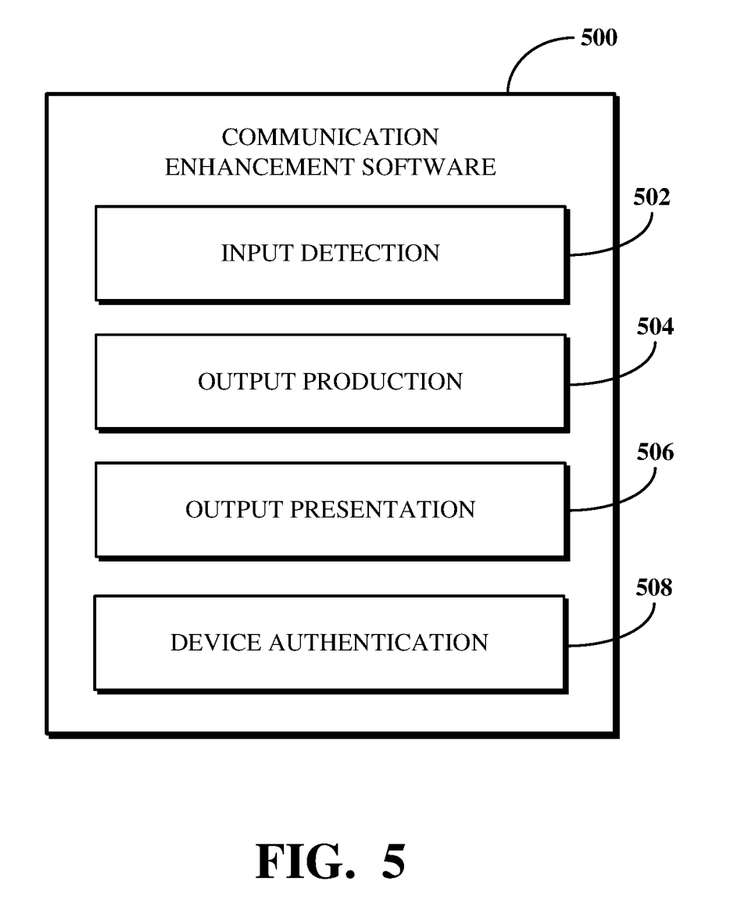
FIG. 5 is a block diagram of an example of functionality of communication enhancement software used with a face covering device.

FIG. 5 is a block diagram of an example of functionality of communication enhancement software 500 used with a face covering device, which may, for example, be the face covering device 402 shown in FIG. 4. The communication enhancement software 500 may, for example, be the communication enhancement software 406 shown in FIG. 4. The communication enhancement software 500 includes tools for detecting, processing, and presenting multi-modal sensor information in the form of input captured using one or more input components at a face covering device and output produced based on that input. As shown, the communication enhancement software 500 includes an input detection tool 502, an output generation tool 504, an output presentation tool 506, and a device authentication tool 508.

The input detection tool 502 detects input captured using one or more input components of the face covering device. In particular, the input detection tool 502 detects input data such as audio input data captured using one or more microphones of the face covering device and/or visual input data captured using one or more cameras of the face covering device. The input may be represented in one or more formats. In some implementations, the input detection tool 502 may include or otherwise use one or more software codecs for compressing the input data to prepare same for further processing, including decompressing, in the remaining tools of the communication enhancement software 500.

The output generation tool 504 processes the input data to produce output for presentation at one or more output components of the face covering device. Processing the input data can include one or more of processing the input data using one or more mappings determined using one or more machine learning models, translating the input data into a different language within the same format, trans-mediating the input data into a different format, predicting further inputs which may later be captured using the one or more input components of the face covering device, scaling the input data, or the like.

Processing the input data using a mapping determined using a machine learning model includes determining an output to present based on the input data according to the mapping. For example, the input data may be parameterized and calibrated to a standardized format in which the values thereof may then be compared to a set of values defined for the mapping. Upon the identification of a matching value, whether the matching value is identical to the parameterized and calibrated input data or instead within a threshold variance thereof such that a high correlation exists therebetween, an output corresponding to the matching value is identified. That output is then used for the input data.

Translating the input data can include translating the input data from a first spoken or written language to a second spoken or written language, in which the translation does not alter a format of the input data. For example, where the input data is audio data, the translated input data will also be audio data. Similarly, where the input data is visual data, the translated input data will also be visual data. The translating may be performed using a translation service onboard the face covering device which accesses a local library for translations or by accessing a server which implements the translation service, such as over the Internet or another network.

Trans-mediating the input data can include processing a format of the input data to produce output in a different format. For example, trans-mediation can include changing input from speech to text or to another visual indicator, such as to indicate a certain indication, voiced letter, word, sentence, or the like for presentation to an audience. For example, the word "stop" when spoken by the wearer of the face covering device may be processed using trans-mediation to cause a red light, an image of a stop sign, or another visual cue to be presented at a display of the face covering device. In another example, trans-mediation can include changing visual input data into an avatar such as a cartoon representation of the wearer of the face covering device such as where a configuration is defined to not use direct visual input for presentation. In some implementations, trans-mediation can include using mappings determined using a machine learning model to determine the output format. For example, mappings determined using a machine learning model trained for mouth shape and lip reading can be used to trans-mediate visual input data including images or video of a mouth of the wearer of the face covering device to text to display on a display of the face covering device. Trans-mediation as described herein may be particularly useful in present output in certain contexts, such as where a teacher or other education professional wears a face covering device as disclosed herein to convey sentiments to students or others studying language or social learning, or where a person interacting with a wearer of a face covering device as disclosed herein has a disability preventing or limiting perception in one or more senses.

Predicting further inputs can include comparing the input data against historical data to identify a pattern and predicting next input data to be captured based on the pattern. For example, the historical data may be stored in a local buffer in onboard memory or included in a library in onboard storage. The historical data can be searched through based on the input data to identify similar data. Based on relationships between the subject historical data identified through some number of searches based on some number of input data, next input data can be predicted. That predicted input data may in at least some cases be used as the output to present in connection with current input data, such as to anticipate a further speech sound, non-speech sound, expression, or other aspect which may be detected for the wearer of the face covering device.

Scaling the input data can include scaling a volume of audio input, scaling a resolution of visual input, or the like. For example, audio input data can be scaled to produce audio output data which has a volume which is louder than a volume at which the audio input data was captured. In another example, visual input data can be scaled to produce visual output data which has a resolution which is lower than a resolution at which the visual input data was captured. In particular, the scaling processing can be performed to reduce a muffled quality of the audio input and to increase the volume thereof for easier perception by an audience, to preserve compute resources, network bandwidth, or the like otherwise spent processing and displaying large image or video content, both, or the like.

The input data can be processed in real-time or stored for later processing, such as within a local buffer in a memory of the face covering device. For example, the input data may be stored for later processing to train a machine learning model such as to recognize certain inputs or combinations thereof as pertaining to certain visual or audio information. Processing includes producing output based on the input. The output may be of the same format as the input. For example, input received with audio data such as speech or non-speech sounds from the wearer of the face covering device may be output as audio representative of those speech or non-speech sounds. Alternatively, the output may be of a different format than the input. For example, input received with audio data such as speech or non-speech sounds from the wearer of the face covering device may be output as a visual indicator such as a light or emoticon which indicates to an audience that the wearer is preparing to speak or is in need of help. In some such cases, the output may be of both the same format as the input and a different format than the input.

In some implementations, processing the input data can include discarding some or all of the input data such that the input data that is discarded will not be output for presentation to an audience. For example, a threshold may be defined for the processing to prevent false positive input data from being undesirably processed into output for presentation. For example, the threshold may serve to prevent minor, brief twitches or mouth movements which are not intended to convey speech or an expression from being processed into a presentable output. The threshold may be defined by the wearer of the face covering device or by a developer of the communication enhancement software 500. Alternatively, the threshold may be defined using a machine learning model trained to determine false positives as input data not significant to speech, non-speech, or expression input.

The output presentation tool 506 presents the output produced by processing the input data to a speaker, display, or other output component of the face covering device and/or of a secondary device. The output may be in the form of speech, an emoticon, a picture representative of speech and/or expression, or the like. Where the processed input is video of the mouth area of the wearer of the face covering device, presenting the output may include displaying the output at a display located over a mouth of the wearer on the face covering device so as to appear as if the wearer is not wearing the face covering device. In some implementations, visual input may be presented at an external display device, which may, for example, be a television, a computer, a mobile device, a headset including a display (e.g., an alternate or augmented reality headset), or the like. Present a light indicating the wearer of the face covering device is about to speak or is in need of help. The particular manner of presentation is based on both the output as well as the processing performed to produce the output.

In some implementations, presenting the output can include using one or more enhanced communications techniques. For example, an audio signal including audio output data may be beam shaped using a radio frequency signal. With beam-forming, such as via an array of microphones and speakers, clarity of audio may be enhanced especially based on a reduction of ambient noise. For example, radio frequency signals may be used to assist in the beam shaping of an audio signal. In particular, the leveraging of radio frequency signals which travel faster than audio waves may improve the latency of the transmission and directional processing.

The device authentication tool 508 authenticates a secondary device to use to present the output. The secondary device may, for example, be a second face covering device, an external speaker, an external display, and/or another device other than the face covering device. Authenticating the secondary device can include pairing the face device with the secondary device (e.g., using Bluetooth or a like communication protocol), performing a handshake (e.g., a transmission control protocol (TCP) handshake) between the face covering device and the secondary device, verifying a previous configuration for using the secondary device (e.g., using configuration data such as which may be stored in an onboard storage of the face covering device), or another approach. The secondary device may receive a signal including the output data responsive to or otherwise after the authentication is completed. In some implementations, the authentication of a secondary device may be optional.

Although the tools 502 through 508 are shown as functionality of the communication enhancement software 500 as a single piece of software, in some implementations, some or all of the tools 502 through 508 may exist outside of the communication enhancement software 500. In some implementations, two or more of the tools 502 through 508 may be combined into a single tool of the communication enhancement software 500. In some implementations, the communication enhancement software 500 may omit one or more of the tools 502 through 508 and/or include other tools not described herein.

Figure 6:
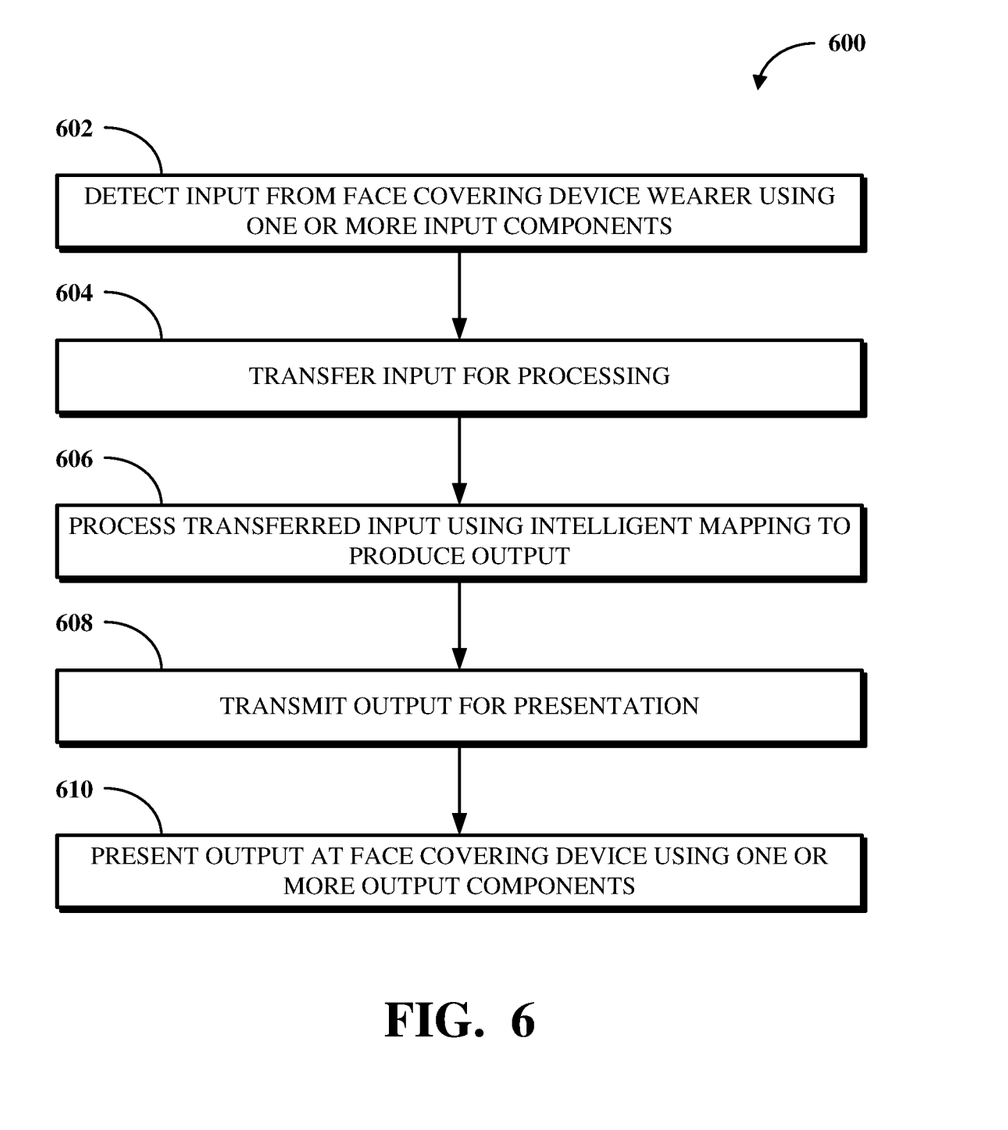
FIG. 6 is a flowchart of an example of a technique for enhancing one or more communication modalities using a face covering device including integrated sensors.

To further describe some implementations in greater detail, reference is next made to examples of techniques which may be performed using multi-modal sensor integrations for enhancing communications using face coverings. FIG. 6 is a flowchart of an example of a technique 600 for enhancing one or more communication modalities using a face covering device including integrated sensors. The technique 600 can be executed using computing devices, such as the systems, hardware, and software described with respect to FIGS. 1-5. The technique 600 can be performed, for example, by executing a machine-readable program or other computer-executable instructions, such as routines, instructions, programs, or other code. The steps, or operations, of the technique 600 or another technique, method, process, or algorithm described in connection with the implementations disclosed herein can be implemented directly in hardware, firmware, software executed by hardware, circuitry, or a combination thereof.

For simplicity of explanation, the technique 600 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 602, input data is detected using one or more input components of a face covering device. The input data represents audio and/or visual input received from a wearer of the face covering device. For example, the input data may be audio input data spoken, sung, hummed, or otherwise verbally presented by the wearer of the face covering device which is captured using one or more microphones of the face covering device. In another example, the input data may be visual input data captured using one or more cameras of the face covering device and representing visual aspects of the wearer of the face covering device within fields of view of those cameras. The visual input data may include image content and/or video content. In yet another example, the input data may be both audio input data and visual input data.

At 604, the detected input is transferred from the one or more input components to a processing for processing. The processing component may be a processor onboard the face covering device. For example, transferring the detected input to the processor of the face covering device may include locally buffering the input in a memory onboard the face covering device until it is retrieved by the processor. In some implementations, the processing component is external to the face covering device. For example, a secondary device, such as a mobile device, paired with the face covering device such as via a Bluetooth connection may be used as the processing component. The transferring can include transmitting the sensor data from a local storage or temporary buffer of the face covering device to a remote processing aspect.

At 606, the transferred input is processed to produce output. In particular, the transferred input may be processed using one or more mappings determined using machine learning models trained for a particular function. Alternatively, or additionally, the transferred input may be processed by translating the transferred input into a different language within the same format, trans-mediating the transferred input into a different format, predicting further inputs which may later be captured using the one or more input components of the face covering device, and/or scaling the transferred input.

At 608, the output is transmitted to one or more output components for presentation. The one or more output components may be output components of the face covering device. For example, the one or more output components may include one or more speakers, displays, light indicators, headphones, earphones, hearing aids, cochlear implants, and/or other output components at the face covering device itself. Alternatively, some or all of the one or more output components may be secondary devices or output components of secondary devices. For example, the output may be transmitted to a speaker located elsewhere in the environment in which the wearer of the face covering device is located. For example, the output may be modulated onto a wireless signal using radio frequency, infrared, or the like that is then transmitted to a speaker, mobile device, wireless headset, or the like. Depending on what the output component is and where it is located, transmitting the output to the one or more output components may include using an audio spectrum, a radio frequency, a cellular connection, infrared, or another wired or wireless communication technique to transmit the output.

At 610, the output is presented at the face covering device using the one or more output components. The output is presented to a determined location, direction, and/or position relative to the face covering device. The determined location, direction, and/or position may be determined using one or more audio, video, image, radio, or LIDAR techniques so as to shape the transmission signal. For example, radio frequency signals may be used to assist in the beam shaping of an audio signal by leveraging the faster transmission of radio frequency signals comped to audio, which improves the latency of the transmission and directional processing. The direction in which to transmit the output may be estimated based on audio signals received within the environment in which the wearer of the face covering device is located. Alternatively, the direction in which to transmit the output may be determined using input captured using one or more cameras of the face covering device and processed to identify objects likely to be people within the environment in which the wearer of the face covering device is located, such as based on a facial detection process performed against that camera input and/or based on a direction in which the wearer of the face covering device is looking as determined using one or more cameras which capture visual input representative of his or her eyes.

In some implementations, the output may be produced by processing sensor data received from a sensor other than an audio input component or a visual input component. For example, the output may be produced based on sensor data from one or both of a temperature sensor or a haptic sensor integrated within the face covering device. For example, the temperature sensor and/or the haptic sensor may be integrated within the body or the securing mechanism of the face covering device. In some such implementations, a machine learning model trained for biometric and sentiment analysis may be used to process the sensor data from the temperature sensor and/or the haptic sensor to produce the output, either individually or in combination with the one or more audio input components and/or the one or more visual input components. For example, the machine learning model may be trained using training data samples which correspond biometric measurements such as represented by temperature and/or haptic information to sentiments of the wearer of the face covering device or of another human. For example, biometric measurements representative of relatively high levels of sweat and/or shaking may be mapped to a nervous sentiment. In another example, tensing skin and/or an accelerating heart rate may be mapped to an angry sentiment. Output representative of the mapped sentiment may then be included in the output presented at the face covering device.

In some implementations, audio output presented at the face covering device may omit some audio input captured by an audio input component. For example, audio input captured by an external microphone can be used to adjust or reduce the noise and interference created by unwanted audio sources. For example, the technique 600 can include performing ambient noise reduction such as by onboard noise cancellation based on the audio input captured using the external microphone.

In some implementations, where a second face covering device receives the output for presentation, signals transmitted to the second face covering device may be decoded only at the second face covering device, such as by the first face covering device transmitting an encryption key at a start of the conversation (e.g., based on an authentication of the second face covering device at the first face covering device) and by the second face covering device thereafter using the encryption key to decrypt signals received from the so-called first face covering device. For example, this exchange may enable a private or semi-private communication session between the wearer of the first face covering device and the wearer of second face covering device.

In some implementations, the raw audio and/or visual input captured using the one or more input components of the face covering device may be immediately output for presentation at the one or more output components of the face covering device. In some such implementations, the technique 600 may omit transferring and processing the captured input and transmitting and presenting the output as a processed form of the input. In some such implementations, the technique 600 may still perform the transferring and processing of the captured input to prepare the processed input for use in training a machine learning model used for communication enhancement with the face covering device. For example, the processed input may still be used to train a machine learning model to recognize idiosyncratic aural and visual traits of the wearer of the face covering device such as to improve speech sound, non-speech sound, and/or expression recognition for later received input.

The implementations of this disclosure can be described in terms of functional block components and various processing operations. Such functional block components can be realized by a number of hardware or software components that perform the specified functions. For example, the disclosed implementations can employ various integrated circuit components (e.g., memory elements, processing elements, logic elements, look-up tables, and the like), which can carry out a variety of functions under the control of one or more microprocessors or other control devices. Similarly, where the elements of the disclosed implementations are implemented using software programming or software elements, the systems and techniques can be implemented with a programming or scripting language, such as C, C++, Java, JavaScript, Python, assembler, or the like, with the various algorithms being implemented with a combination of data structures, objects, processes, routines, or other programming elements.

Functional aspects can be implemented in algorithms that execute on one or more processors. Furthermore, the implementations of the systems and techniques disclosed herein could employ a number of conventional techniques for electronics configuration, signal processing or control, data processing, and the like. The words "mechanism" and "component" are used broadly and are not limited to mechanical or physical implementations, but can include software routines in conjunction with processors, etc. Likewise, the terms "system" or "tool" as used herein and in the figures, but in any event based on their context, may be understood as corresponding to a functional unit implemented using software, hardware (e.g., an integrated circuit, such as an ASIC), or a combination of software and hardware. In certain contexts, such systems or mechanisms may be understood to be a processor-implemented software system or processor-implemented software mechanism that is part of or callable by an executable program, which may itself be wholly or partly composed of such linked systems or mechanisms.

Implementations or portions of implementations of the above disclosure can take the form of a computer program product accessible from, for example, a computer-usable or computer-readable medium. A computer-usable or computer-readable medium can be a device that can, for example, tangibly contain, store, communicate, or transport a program or data structure for use by or in connection with a processor. The medium can be, for example, an electronic, magnetic, optical, electromagnetic, or semiconductor device.

Other suitable mediums are also available. Such computer-usable or computer-readable media can be referred to as non-transitory memory or media, and can include volatile memory or non-volatile memory that can change over time. A memory of an apparatus described herein, unless otherwise specified, does not have to be physically contained by the apparatus, but is one that can be accessed remotely by the apparatus, and does not have to be contiguous with other memory that might be physically contained by the apparatus.

While the disclosure has been described in connection with certain implementations, it is to be understood that the disclosure is not to be limited to the disclosed implementations but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A face covering device, comprising:
    one or more microphones configured to capture audio input data representing speech or non-speech sounds from a wearer of the face covering device;
    one or more cameras configured to capture visual input data representing expressions of the wearer of the face covering device;
    one or more speakers configured to present audio output data produced based on the audio input data;
    one or more displays configured to present visual output data produced based on the visual input data;
    a memory configured to store instructions for communication enhancement software;
    a processor configured to execute the instructions to detect the audio input data, detect the visual input data, process the audio input data to produce the audio output data, process the visual input data to produce the visual output data, cause the presentation of the audio output data at the one or more speakers, and cause the presentation of the visual output data at the one or more displays;
    a body configured to cover at least a portion of a face of the wearer, the body including the one or more microphones, the one or more cameras, the one or more speakers, and the one or more displays; and
    a securing mechanism configured to removably couple the face covering device to at least a portion of the wearer.

2. The face covering device of claim 1, wherein a mouth of the wearer of the face covering device is within a first field of view of a first camera of the one or more cameras and eyes of the wearer of the face covering device are within a second field of view of a second camera of the one or more cameras, and
    wherein, to process the visual input data to produce the visual output data, the processor is configured to execute the instructions to determine an expression of the wearer of the face covering device based on first visual input data captured using the first camera and second visual input data captured using the second camera.

3. The face covering device of claim 2, wherein the first visual input data and the second visual input data are processed using a mapping determined using a machine learning model trained for expression recognition to determine an expression of the wearer of the face covering device, and wherein the visual output data presented using the one or more displays represents the expression.

4. The face covering device of claim 3, wherein the expression is represented using an emoticon selected responsive to the determining of the expression.

5. The face covering device of claim 2, wherein, to cause the presentation of the audio output data at the one or more speakers and to cause the presentation of the visual output data at the one or more displays, the processor is configured to execute the instructions to determine a direction in which to project the audio output data using a mapping determined using a machine learning model trained to correlate the second visual input data and the audio input data.

6. The face covering device of claim 5, further comprising:
one or more external microphones configured to capture acoustic information within an environment in which the wearer of the face covering device is located, wherein the processor is further configured to execute the instructions to dynamically map the environment in which the wearer of the face covering device is located using the acoustic information, and wherein the direction in which to project the audio output data is determined using the dynamic mapping of the environment.

7. The face covering device of claim 1, wherein the audio output data is presented in a volume louder than a volume at which the audio input data is captured.

8. The face covering device of claim 1, wherein the securing mechanism includes one or both of a temperature sensor or a haptic sensor, and wherein, to produce one or both of the audio output data or the visual output data, the processor is configured to execute the instructions to process sensor data received from the one or both of the temperature sensor or the haptic sensor using a machine learning model trained for biometric and sentiment analysis.

9. A face covering device, comprising:
a memory configured to store instructions;
a processor configured to execute the instructions to detect audio input data captured using a first input component, detect visual input data captured using a second input component, process the audio input data to produce audio output data, process the visual input data to produce the visual output data, cause the presentation of the audio output data at a first output component by beam shaping an audio signal including the audio output data using a radio frequency signal, and cause the presentation of the visual output data at a second output component; and
a body configured to cover at least a portion of a face of a wearer of the face covering device, the body including the first input component, the second input component, the first output component, and the second output component.

10. The face covering device of claim 9, wherein the body is configured to removably couple with a face covering.

11. The face covering device of claim 9, wherein one or both of the first output component or the second output component are external to the face covering device.

12. The face covering device of claim 9, further comprising:
a proximity sensor configured to detect an object within a near proximity of the face covering device, wherein the processor is further configured to execute the instructions to process sensor data captured using the proximity sensor to present output alerting the wearer of the face covering device as to the near proximity of the object to the face covering device.

13. The face covering device of claim 9, wherein, to cause the presentation of the audio output data at a first output component and to cause the presentation of the visual output data at a second output component, the processor is configured to execute the instructions to scale a volume of the audio input data and to scale a resolution of the visual input data.

14. The face covering of claim 11, comprising:
a securing mechanism configured to removably secure the body to at least a portion of a face of a wearer of the face covering device.

15. The face covering of claim 13, comprising:
a securing mechanism configured to removably secure the body to at least a portion of a face of a wearer of the face covering device.

16. A face covering device, comprising:
a memory configured to store instructions;
a processor configured to execute the instructions to detect audio input data captured using a first input component, detect visual input data captured using a second input component, process the audio input data to produce audio output data, process the visual input data to produce the visual output data, cause the presentation of the audio output data at a first output component, cause the presentation of the visual output data at a second output component, store the audio input data and the visual input data as stored data within a local buffer in the memory, and transmit the stored data to a server for use in training a machine learning model to be used with multiple face covering devices; and
a body configured to cover at least a portion of a face of a wearer of the face covering device, the body including the first input component, the second input component, the first output component, and the second output component.

17. The face covering device of claim 16, wherein the processor is configured to change the audio input data into a text format for presentation.

18. The face covering device of claim 16, wherein the first input component includes one or more microphones and the second input component includes one or more cameras.

19. The face covering device of claim 16, wherein the first output component includes one or more speakers and the second output component includes one or more displays.

20. The face covering device of claim 16, wherein the second output component includes a light indicator configured to represent an expression of the wearer of the face covering device using a color output to the light indicator.

* * * * *